United States Patent

[11] 3,617,583

| [72] | Inventors | Gerald Moss<br>Oxford;<br>Geoffrey P. Richard, Didcot, both of England |
|---|---|---|
| [21] | Appl. No. | 862,077 |
| [22] | Filed | Sept. 29, 1969 |
| [45] | Patented | Nov. 2, 1971 |
| [73] | Assignee | Esso Research and Engineering |
| [32] | Priority | Oct. 9, 1968 |
| [33] | | Great Britain |
| [31] | | 47,895/68 |

[54] PRODUCTION OF LIME
9 Claims, No Drawings

[52] U.S. Cl. ....................................................... 263/53 R,
263/21 A
[51] Int. Cl. ....................................................... C04b 7/44

[50] Field of Search ............................................. 263/21 A, 53

[56] References Cited
UNITED STATES PATENTS

| 3,127,455 | 3/1964 | Culbertson, Jr. et al. | 263/53 |
| 3,417,978 | 12/1968 | Suzukawa et al. | 263/53 |
| 3,483,280 | 12/1969 | Einstein et al. | 263/53 |

Primary Examiner—John J. Camby
Attorneys—Pearlman and Stahl and Louis F. Kreek, Jr.

ABSTRACT: A high-sulfur fuel oil can be used for firing limestone in lime kilns. The fuel oil is passed through a fluidized bed gasifier, containing fluidized lime or limestone which reacts with sulfur in the fuel oil, and substantially sulfur-free gases pass from the gasifier to fire the lime kiln.

PRODUCTION OF LIME

This invention relates to improvements in the production of lime, having a low sulfur content, wherein there is used a hydrocarbon fuel, e.g. a hydrocarbon fuel oil, or coal, or fuel gases derived therefrom, containing initially an appreciable amount of sulfur, for the lime-burning step. In the invention the hydrocarbon fuel is subjected to gasification in a gasifier having a fluidized bed of material that reacts with sulfur or sulfur-containing compounds present in the fuel oil, to form solid sulfur compounds, and the resulting, sulfur-free or sulfur-reduced, gases passed to the lime kiln for the lime-burning step and burned in the lime kiln. The invention, although not limited thereto, is particularly applicable to the employment of sulfur-containing fuel oils for lime burning.

Fuel oil gasifiers, consisting of refractory lined vessels, in which fuel oil is burned with substoichiometric amounts of air, are known and such gasifiers have been used to provide the combustion gases for burning in lime kilns. In these processes the gases leaving the combustion chamber have a temperature in the region of 1,200° C. and typically contain about 13 percent of CO and 10–15 percent of $H_2$. This method has a number of basic disadvantages amongst which are that an incoming gas temperature of 1,200° C. is too high for the gases to be fed to a lime kiln and that the gases will contain the sulfur, or sulfur compounds, present in the original fuel. In order to minimize these disadvantages it is the practice to spray water into the gas to reduce its temperature to about 800°–900° C. before it is injected into the lime kiln and to operate the lime kiln under mildly reducing conditions to minimize sulfur pickup by the lime. The heat consumption of gasifier fired lime kilns, which is of the order of 1,200–1,400 Kcal./kg. CaO shows an undesirable heat waste compared with a heat consumption of 1,000–1100 Kcal./kg. CaO which can be obtained from efficient lime kilns of different design. Furthermore, sulfur pickup by the lime is not prevented by operating the lime kiln under mildly reducing conditions and it has been found that a typical residual fuel oil, containing about 3.5 percent of sulfur, will produce a lump lime containing about 0.1 percent of sulfur. For use in many industries, e.g. in the steel industry, the desired sulfur content should not exceed 0.05 percent and, in order to achieve this, it has been necessary to use a fuel oil containing less than 1.0 percent of sulfur for the lime-burning operation; even when such a low sulfur content fuel is used the lime fines generally contain more than 0.05 percent of sulfur and the product needs to be screened before sale to industry. Since a large proportion of the lime produced is used in the steel industry (about one-third in Europe), this is a problem of considerable importance to lime manufacturers.

Hydrocarbon fuel oils typically contain sulfur or sulfur compounds. In British Pat. No. 1,183,937, issued Mar. 11, 1970, the removal of sulfur and sulfur compounds from fuel oils by their reaction with a fluidized bed of a material that reacts with the sulfur and sulfur compounds to form solid compounds is described; Examples of suitable fluidized bed material are calcium carbonate, magnesium carbonate and dolomite, which decompose to their oxides on heating, or the oxides of calcium, magnesium and iron, and the process may be operated under oxidizing conditions to form sulfates, or under reducing conditions to form sulfides.

We have now found that if a hydrocarbon fuel, e.g. a fuel oil, containing sulfur, or sulfur compounds, is burned or partly burned, in a gasifier, preferably with a substoichiometric amount of oxygen, in a fluidized bed of sulfur reactive material as above referred to, e.g. limestone or lime, much of the sulfur content reacts with the fluidized bed material and a fuel gas of low sulfur content is obtained. The oxygen is suitably provided by using air although oxygen itself, or oxygen/air mixtures may be used. The fluidized bed gasifier, which is suitably adapted from a small fluidized bed lime kiln, is placed in circuit with a main lime kiln so that substantially sulfur reduced gases pass to the main lime kiln, two product streams being obtained the smaller one containing most of the sulfur from the gasifier and the larger one from the main lime kiln containing substantially sulfur-free lime. In the preferred process the bed temperature of the gasifier is 800°–900° C., especially 850°–900° C., using about 25–50 percent, especially 30 percent, of the stoichiometric air requirement. The following is an example result of reacting a fuel in this way:

| Bed Temperature | Stoichiometric Air | Gas Analysis | | |
|---|---|---|---|---|
| 850° C. | 29.6% | $CO_2$ | CO | $H_2$ |
| | | 9 | 12 | 9 |
| Fuel Oxidized (1) | Fuel Sulfur Absorbed by Bed | Fuel Sulfur Found in Gas | | |
| about 50% | 90% | 5.5% | | |

(1) Calculated proportion of fuel converted to CO and $CO_2$.

In a preferred form of the invention the fuel gasifier is a small bed of fluidized lime, continuously or intermittently fed with limestone of particle size 0.5 to 2.0 mm.; small sized quarry limestone, which is usually rejected, is suitable for this purpose. The calcining bed of this kiln is suitably maintained at 850°–900° C., by controlling the limestone throughput relative to that of the fuel and, if the equipment is efficiently insulated, about 0.77 kg. of fuel will be gasified for each kg. of lime produced in this kiln; the following is typical of the products obtained:

| | |
|---|---|
| Lime produced (kg./kg. of fuel) | 1.3 |
| (1) Sulfur content of lime (%) | 2.4 |
| Fuel gas produced ($Nm^3$/kg. of fuel) | 4.4 |
| Gas temperature | about 900 |
| Gas Composition | |
| % $CO_2$ | 16.5 |
| % CO | 12.0 |
| % $H_2$ | 9.0 |
| Unburned hydrocarbons (g./$Nm^3$) | 125 |
| Heating value of as (sensible and chemical) | |
| K cal/$Nm^3$ | 2,000 |

(1) Based on 90% absorption from a fuel oil containing 3.5% of sulfur.

In an efficiently designed gas-fired shaft lime kiln the fuel gas from the gasifier can be utilized to calcine lime at a heat range of about 1,100 Kcal./kg. of lime, then for each kg. of fuel gasified about 8 kg. of low sulfur content lime will be obtained; even if all the sulfur escaping from the gasifier is absorbed in the main line kiln the product will contain no more than about 0.04 percent of sulfur. Segregation of sulfur on lime dust is apt to occur so that the sulfur content of the lump lime will be even less. Overall, the system will produce about 9.3 kg. of lime for each kg. of fuel used, equivalent to a heat consumption of less than 1,100 Kcal./kg. of lime, representing a substantial saving in fuel costs, compared with a conventional gasifier, together with an increase in overall production capacity.

It will be apparent that the design of the kiln/gasifier may take a number of forms: for example it may be a conventional fluid bed lime kiln without a limestone preheat bed or a conventional gasifying burner may be used in conjection with a transfer line reactor. Other forms of gasifier will be apparent.

The high-sulfur lime stream may be used, e.g. as a fertilizer, or it may be stripped of sulfur by passage through a regenerator as described in British Pat. No. 1,183,937 and recycled or otherwise disposed of. Alternatively, the high-sulfur lime stream may be treated, preferably in a separate regenerator to regenerate the metallic oxide which can be returned to the gasifier for the removal of sulfur from further amounts of sulfur containing hydrocarbon fuel, the sulfur being liberated in the regenerator in the form of gaseous sulfur compounds, usually $SO_2$. The solid sulfur-containing compounds formed in the gasifier may be removed, continuously or intermittently from the gasifier and may be replaced wholly or in part with fresh sulfur reactive metallic oxide or the corresponding carbonate.

The aforesaid gaseous sulfur compounds in the form of $SO_2$ may be partially reduced, preferably after passing to a separate vessel to produce a mixture of $SO_2$ and $H_2S$ and the mixed gases passed over a suitable catalyst such as alumina at a reaction temperature of, e.g. about 230° C. whereby elemental sulfur is produced in accordance with the following reaction: $So_2 + H_2S \rightarrow 0H_2O + 3S$

What we claim is:

1. A process for the production of lime of low sulfur content which comprises:
  a. gasifying a hydrocarbon fuel containing sulfur with a substoichiometric quantity of oxygen in a gasifier having a fluidized bed of a material that reacts with sulfur in the hydrocarbon fuel to form solid sulfur-containing compounds and a fuel gas of reduced sulfur content: and
  b. passing said fuel gas of reduced sulfur content to a lime kiln and burning limestone with said fuel gas to form lime of low sulfur content.

2. A process according to claim 3 in which a material containing said sulfur-containing compounds is withdrawn from the gasifier and the corresponding metallic oxide is regenerated and returned to said gasifier.

3. A process as claimed in claim 1 wherein the said material that reacts with sulfur, is an oxide or a heat decomposible carbonate, of calcium and/or magnesium.

4. A process as claimed in claim 1 wherein the said hydrocarbon fuel is a hydrocarbon fuel oil.

5. A process as claimed in claim 1 wherein the said hydrocarbon fuel is coal.

6. A process as claimed in claim 1 wherein the said amount of oxygen is from 40 to 60 percent of the stoichiometric requirement.

7. A process as claimed in claim 1 wherein the bed temperature in the said gasifier is from 800° to 950° C.

8. A process as claimed in claim 1 wherein the particles size of the fluidized bed material in the gasifier is from 0.5 to 2 mm.

9. A process as claimed in claim 1 wherein sulfur reactive material is passed, continuously or intermittantly, through the gasifier and wherein the temperature in the gasifier is controlled by controlling the throughput of the sulfur reactive fluidized bed material relative to that of the hydrocarbon fuel being gasified in the gasifier.

* * * * *